United States Patent
Tano et al.

(10) Patent No.: US 10,615,437 B2
(45) Date of Patent: Apr. 7, 2020

(54) FUEL CELL SYSTEM INCLUDING CONVERTER BOOSTING OUTPUT VOLTAGE BASED ON DUTY RATIO

(71) Applicant: TOYOTA JIDOSHA KABUSHIKI KAISHA, Toyota-shi, Aichi-ken (JP)

(72) Inventors: Yutaka Tano, Toyota (JP); Shinji Aso, Toyota (JP); Yuji Kakeno, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 39 days.

(21) Appl. No.: 15/873,241

(22) Filed: Jan. 17, 2018

(65) Prior Publication Data

US 2018/0205099 A1    Jul. 19, 2018

(30) Foreign Application Priority Data

Jan. 19, 2017   (JP) ................ 2017-007464

(51) Int. Cl.
*H01M 8/04858*    (2016.01)
*H01M 8/04828*    (2016.01)
(Continued)

(52) U.S. Cl.
CPC ....... *H01M 8/0488* (2013.01); *H01M 8/0491* (2013.01); *H01M 8/0494* (2013.01);
(Continued)

(58) Field of Classification Search
CPC ......... H01M 8/04865; H01M 8/04873; H01M 8/0488; H01M 8/04888; B60L 58/40
See application file for complete search history.

(56) References Cited

U.S. PATENT DOCUMENTS

2007/0111057 A1*   5/2007   Kajiwara ............... B60L 58/33
                                                        429/430
2008/0116873 A1*   5/2008   Takada .............. H01M 8/04186
                                                        323/299
(Continued)

FOREIGN PATENT DOCUMENTS

JP    2003-154953 A    5/2003
JP    2006/134601 A    5/2006
(Continued)

OTHER PUBLICATIONS

U.S. Appl. No. 15/638,532, "Fuel Cell System", filed Jun. 30, 2017.
(Continued)

*Primary Examiner* — Imran Akram
(74) *Attorney, Agent, or Firm* — Finnegan, Henderson, Farabow, Garrett & Dunner, LLP

(57) ABSTRACT

A fuel cell system including: a fuel cell; a voltage sensor that measures output voltage of the fuel cell; a converter that boosts the output voltage; and a control unit that controls the converter using a duty ratio including a feedforward term and a feedback term, the feedforward term being set to perform feedforward control, the feedback term being set to perform feedback control, wherein when the control unit causes the converter to boost the output voltage, and when the feedforward term calculated by specified Expression I exceeds an upper limit calculated by specified Expression II, the control unit causes the converter to boost the voltage output from the fuel cell with the duty ratio including the upper limit and the feedback term.

2 Claims, 5 Drawing Sheets

(51) Int. Cl.
*H01M 8/04223* (2016.01)
*H01M 8/04955* (2016.01)
*H01M 8/0612* (2016.01)
*H01M 8/04302* (2016.01)
*H01M 16/00* (2006.01)
*H01M 8/04537* (2016.01)

(52) U.S. Cl.
CPC ... *H01M 8/04223* (2013.01); *H01M 8/04302* (2016.02); *H01M 8/04559* (2013.01); *H01M 8/04955* (2013.01); *H01M 8/0631* (2013.01); *H01M 16/006* (2013.01)

(56) References Cited

U.S. PATENT DOCUMENTS

| | | | |
|---|---|---|---|
| 2008/0220303 A1* | 9/2008 | Yoshida | H01M 8/04097 429/423 |
| 2010/0209792 A1* | 8/2010 | Umayahara | B60L 3/0046 429/429 |
| 2010/0273072 A1* | 10/2010 | Hasegawa | B60L 3/0023 429/431 |
| 2014/0248548 A1* | 9/2014 | Kaneko | H01M 8/0488 429/432 |
| 2015/0244261 A1* | 8/2015 | Toshiyuki | H02M 3/156 323/282 |
| 2016/0001675 A1* | 1/2016 | Kazuno | B60L 1/00 307/9.1 |
| 2016/0141675 A1 | 5/2016 | Kaneko et al. | |
| 2016/0141905 A1* | 5/2016 | Yamanaka | H02J 7/0065 320/135 |
| 2016/0315334 A1* | 10/2016 | Kirchhoff | H01M 8/0494 |
| 2017/0214070 A1* | 7/2017 | Wang | H01M 8/04865 |
| 2017/0222238 A1* | 8/2017 | Kumada | H01M 8/04 |
| 2017/0302155 A1 | 10/2017 | Takagaki et al. | |
| 2018/0019489 A1 | 1/2018 | Kakeno et al. | |
| 2018/0229622 A1* | 8/2018 | Matsumoto | H02M 3/155 |

FOREIGN PATENT DOCUMENTS

| | | |
|---|---|---|
| JP | 2009-268331 A | 11/2009 |
| JP | 2010-162996 A | 7/2010 |
| JP | 2015-019448 A | 1/2015 |
| JP | 2015-139328 A | 7/2015 |
| JP | 2015-220961 | 12/2015 |
| JP | 2016-096042 A | 5/2016 |
| JP | 2017-224546 | 12/2017 |
| WO | WO2016/051567 A1 | 4/2016 |

OTHER PUBLICATIONS

Notice of Allowance issued in U.S. Appl. No. 15/638,532 dated Oct. 18, 2018.

* cited by examiner

FUEL CELL SYSTEM INCLUDING CONVERTER BOOSTING OUTPUT VOLTAGE BASED ON DUTY RATIO

INCORPORATION BY REFERENCE

The disclosure of Japanese Patent Application No. 2017-007464 filed on Jan. 19, 2017 including the specification, drawings and abstract is incorporated herein by reference in its entirety.

BACKGROUND

1. Technical Field

The present disclosure relates to a fuel cell system.

2. Description of Related Art

One of fuel cell systems includes a fuel cell that generates electric power using reactant gas, a voltage sensor that measures output voltage of the fuel cell, and a converter that can boost the output voltage of the fuel cell (Japanese Unexamined Patent Application Publication No. 2015-220961 (JP 2015-220961 A)).

SUMMARY

In the fuel cell system in JP 2015-220961 A, the converter boosts output voltage of the fuel cell when the fuel cell starts power generation. When the converter boosts the output voltage, a duty ratio in the converter is calculated with an estimated value of the voltage output from the fuel cell because it is difficult to perform real-time accurate measurement of an actual output voltage (true value) of the fuel cell that has started power generation and for the purpose of enhancing responsiveness in transient response. When the estimated value is smaller than the actual output voltage value in the fuel cell, the actual output voltage of the fuel cell is excessively boosted and output by the converter in some cases. Accordingly, a technique is demanded which can prevent the converter from executing excessive boosting and output of the actual output voltage of the fuel cell.

The present disclosure can be implemented according to following aspects.

(1) According to one aspect of the present disclosure, a fuel cell system is provided. The fuel cell system includes: a fuel cell that generates electric power using reactant gas; a voltage sensor that measures output voltage of the fuel cell; a converter that boosts the output voltage; and a control unit that controls the converter using a duty ratio including a feedforward term and a feedback term, the feedforward term being set to perform feedforward control, the feedback term being set to perform feedback control. When the control unit causes the converter to boost the output voltage, and (a) when a feedforward term calculated by Expression I below:

$$D\_FF = 1 - \frac{VLtgt}{VH} \quad (I)$$

VH (V): a measurement value of the output voltage of the converter
VLtgt (V): an estimated value of the output voltage of the fuel cell
D_FF: the feedforward term exceeds an upper limit calculated by Expression II below:

$$D\_FF\_ul = 1 - \frac{VL}{VHul} \quad (II)$$

VL (V): a measurement value of the output voltage of the fuel cell by the voltage sensor
VHul (V): a preset upper limit in the output voltage of the converter
D_FF_ul: the upper limit, the control unit causes the converter to boost the output voltage with a duty ratio D1 including the upper limit and the feedback term, and (b) when the feedforward term calculated by Expression I is equal to or below the upper limit, the control unit causes the converter to boost the output voltage with a duty ratio D2 including the feedforward term calculated by Expression I and the feedback term. According to such an aspect, when the upper limit is defined as an upper limit, and the feedforward term exceeds the upper limit, the duty ratio is calculated with the upper limit as the feedforward term. The control unit then causes the converter to boost the output voltage of the fuel cell with the duty ratio D1 that is the sum of the upper limit and the feedback term. This makes it possible to prevent the converter from executing excessive boosting and output of an actual output voltage of the fuel cell.

(2) In the fuel cell system according to the aspect, the upper limit may be calculated using the measurement value VL subjected to one processing out of filter processing and rate processing. According to the aspect, the upper limit can be calculated using an accurate measurement value VL. Accordingly, a proper upper limit can be used for comparison with the feedforward term.

In the fuel cell system of the aspect, in a discontinuous mode involving intermittent application of electric current to a reactor of the converter, the feedforward term may be calculated by Expression III below:

$$D\_FF = \sqrt{2 \cdot L \cdot f \cdot \frac{VH - VL}{VH \cdot VL} \cdot ILtgt} \quad (III)$$

L: inductance of the reactor
f: switching frequency
ILtgt: a target value of effective electric current
VL (V): a measurement value of the output voltage of the fuel cell by the voltage sensor
VH (V): a measurement value of the output voltage of the fuel cell converter
D_FF: the feedforward term and in a continuous mode involving continuous application of electric current to the reactor, the feedforward term may be calculated by Expression I.

Without being limited to the fuel cell system, the aspects of the present disclosure may also be applicable to various aspects, such as fuel cell systems mounted on vehicles, watercraft, and the like that use electric power as a power source, the vehicles themselves, and the watercraft themselves. The present disclosure may also be implemented in the aspect of a computer program that implements these aspects. It should naturally be understood that the present disclosure is not limited in any manner to the aspects disclosed and can be implemented in various aspects without departing from the meaning of the present disclosure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
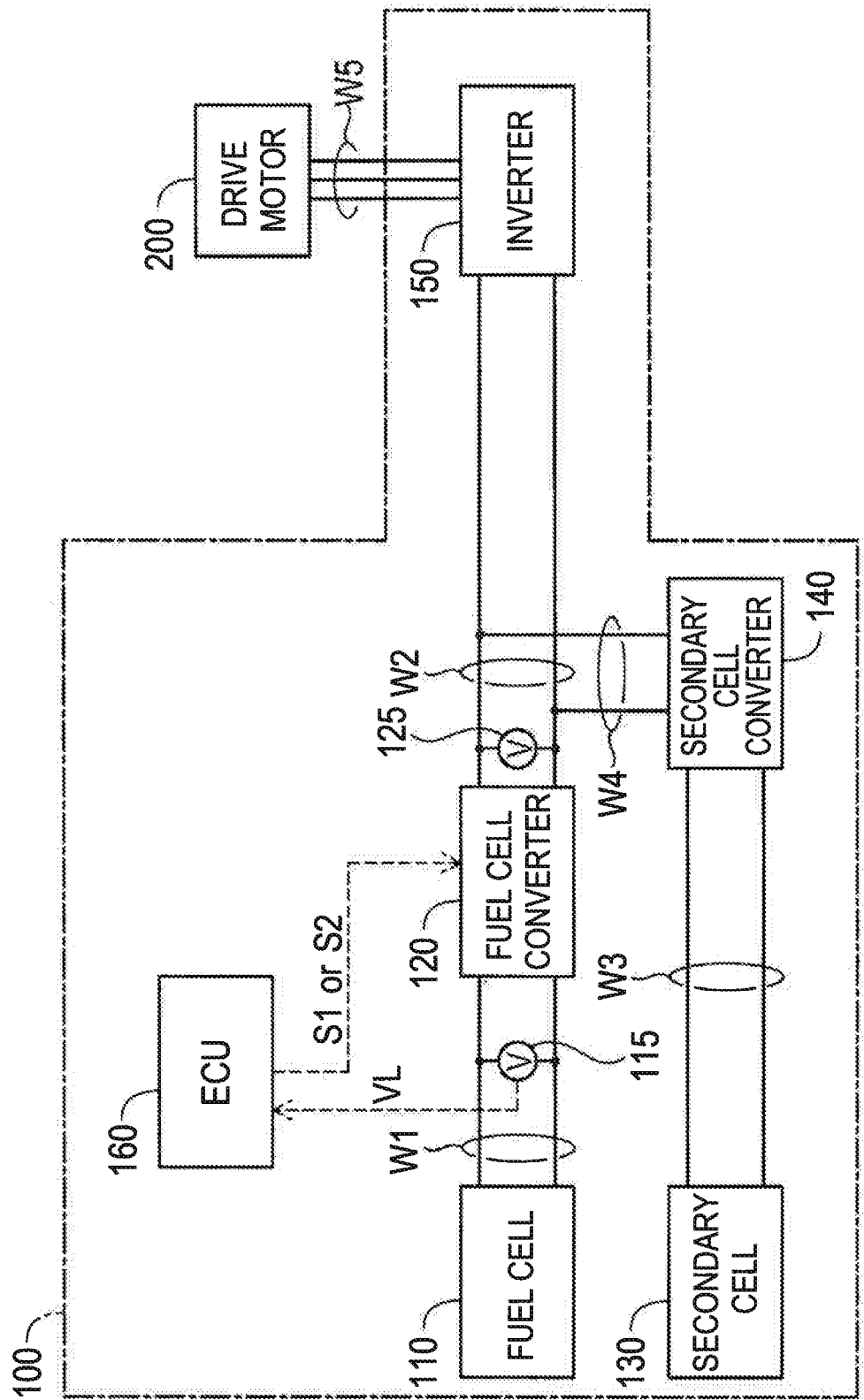
FIG. 1 is an explanatory view illustrating an electrical configuration of a fuel cell system.

FIG. 1 is an explanatory view illustrating an electrical configuration of a fuel cell system 100 according to an embodiment of the present disclosure. The fuel cell system 100 is mounted as a power source of a vehicle driven with a drive motor 200. The fuel cell system 100 includes a fuel cell 110, a voltage sensor 115, a fuel cell converter 120, a voltage sensor 125, a secondary cell 130, a secondary cell converter 140, an inverter 150, and an ECU 160. The fuel cell system 100 also includes a direct current (DC) lead wire W1, a DC lead wire W2, a DC lead wire W3, a DC lead wire W4, and an alternating current (AC) lead wire W5.

The fuel cell 110 is a solid high polymer fuel cell that generates electric power through an electrochemical reaction between hydrogen and oxygen upon receiving supply of hydrogen gas and oxygen. As the fuel cell 110, not only the solid high polymer fuel cell but also fuel cells of various types are adoptable. As the fuel cell 110, a solid oxide fuel cell may be adopted in place of the solid high polymer fuel cell, for example. The fuel cell 110 is electrically connected with the fuel cell converter 120 through the DC lead wire W1.

The voltage sensor 115 is connected to the DC lead wire W1 to measure output voltage of the fuel cell 110. The voltage sensor 115 outputs to the ECU 160 a signal representative of a measurement value VL of the output voltage of the fuel cell 110.

The fuel cell converter 120 is a boosting converter device that performs boosting operation to boost the output voltage of the fuel cell 110 to a target voltage. The fuel cell converter 120 is electrically connected with the inverter 150 through the DC lead wire W2. The fuel cell converter 120 includes a U-phase converter DC1, a V-phase converter DC2, a W-phase converter DC3, and an X-phase converter DC4. The U-phase converter DC1, the V-phase converter DC2, the W-phase converter DC3, and the X-phase converter DC4 are connected in parallel.

Figure 2:
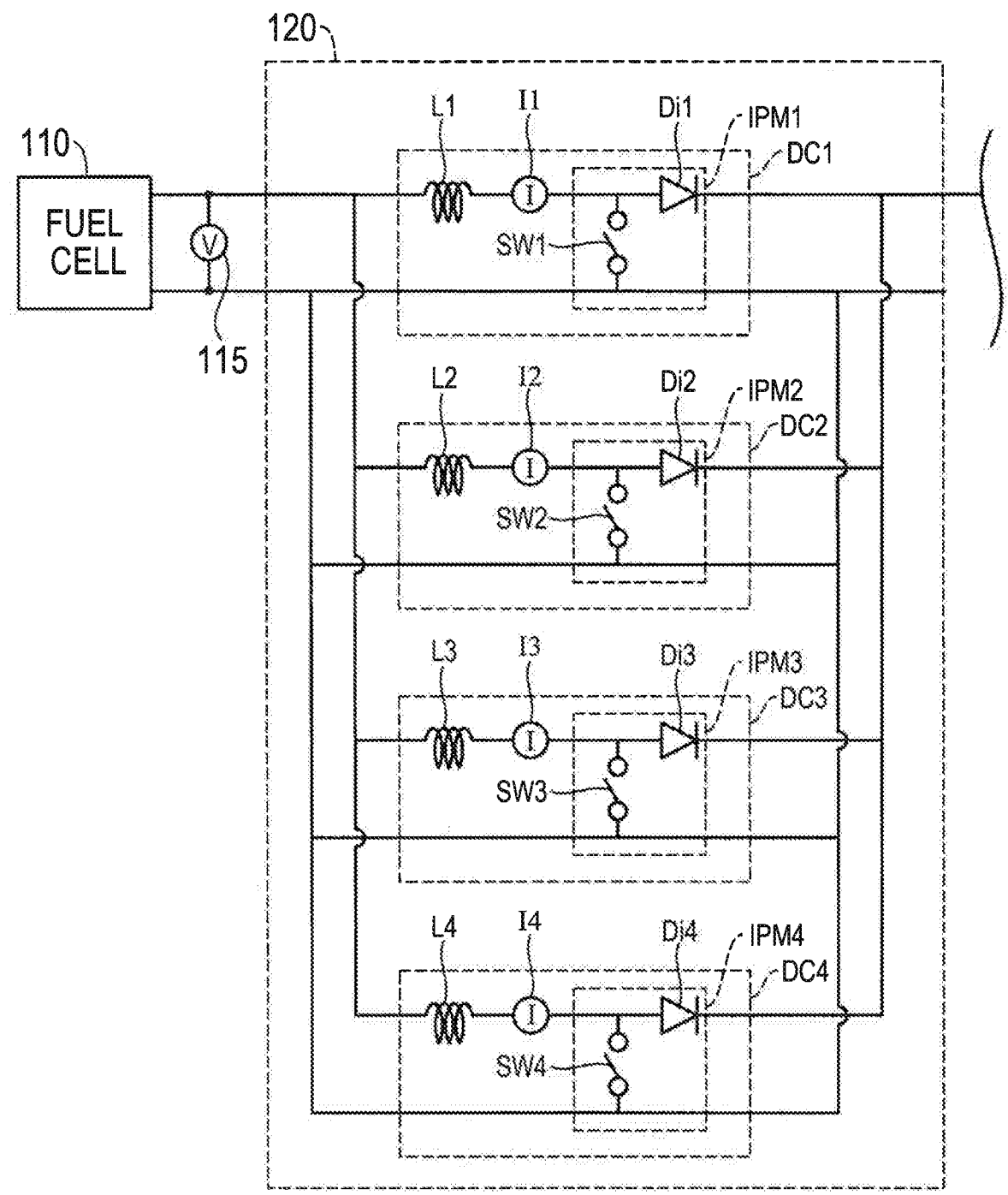
FIG. 2 is an explanatory view illustrating a circuit configuration of a fuel cell converter.

FIG. 2 is an explanatory view illustrating a circuit configuration of the fuel cell converter 120. The U-phase converter DC1 includes a reactor L1, a current sensor I1, and a power module IPM1. The reactor L1 is electrically connected with the fuel cell 110. The reactor L1 is composed of an annular core unit and a coil wound around the outer circumference of the core unit. The reactor L1 can store electric power, and can release the stored electric power. The functions of the reactor L1 to store and release the electric power are used for boosting operation of the voltage by the U-phase converter DC1.

The current sensor I1 is arranged between the reactor L1 and the power module IPM1. The current sensor I1 detects the electric current flowing from the reactor L to the power module IPM1. The power module IPM1 is a circuit module with a plurality of semiconductor elements incorporated therein. The power module IPM1 has a switching element SW1 and a diode Di1.

Periodic switching control is performed on the switching element SW1 when the output voltage of the fuel cell 110 is input. Accordingly, the reactor L1 repeatedly stores and releases electric power in a periodic manner. The electric power released from the reactor L1 is output through the diode Di1. The diode Di1 is what is called a switching diode.

The U-phase converter DC1 regulates a duty ratio (a ratio between an ON state and an OFF state) in the switching element SW1 so as to regulate the input voltage, and outputs the regulated voltage.

The V-phase converter DC2, the W-phase converter DC3, and the X-phase converter DC4 include, like the U-phase converter DC1, reactors L2, L3, IA, current sensors I2, I3, I4, and power modules IPM2, IPM3, IPM4 corresponding thereto. The power modules IPM2, IPM3, IPM4 include, like the power module IPM1, diodes Di2, Di3, Di4, and switching elements SW2, SW3, SW4 corresponding thereto. In the following description, each of the four reactors is generally referred with a reference sign "L", and each of the four switching elements is generally referred with a reference sign "SW."

The V-phase converter DC2, the W-phase converter DC3, and the X-phase converter DC4 regulate the voltage input from the fuel cell 110 based on the same principle as that of the U-phase converter DC1, and output the regulated voltage. Switching control of the switching elements SW1, SW2, SW3, SW4 is performed by regulating duty ratios in the switching elements SW1, SW2, SW3, SW4 such that the electric current values measured by the current sensors I1, I2, I3, I4 become equal to electric current target values.

With reference again to FIG. 1, the voltage sensor 125 is connected to the DC lead wire W2 to measure the voltage output from the fuel cell converter 120.

The secondary cell 130, together with the fuel cell 110, functions as a power source of the fuel cell system 100. The secondary cell 130 is constituted with a lithium ion cell in the present embodiment. In other embodiments, the secondary cell 130 may a cell of other types, such as a lead storage cell, a nickel-cadmium cell, and a nickel-hydrogen cell. The secondary cell 130 is electrically connected with the secondary cell converter 140 through the DC lead wire W3.

The secondary cell converter 140 is a buck-boost converter device having a configuration similar to that of the fuel cell converter 120. The secondary cell converter 140 is electrically connected with the DC lead wire W2 that connects the fuel cell converter 120 and the inverter 150 through the DC lead wire W4. The secondary cell converter 140 regulates the voltage in the DC lead wire W2 to control charging and discharging of the secondary cell 130, the voltage being input voltage of the inverter 150.

When the output electric power from the fuel cell converter 120 is short of a target output electric power, the secondary cell converter 140 makes the secondary cell 130 discharge electric power. When regenerative electric power is generated in the drive motor 200, the secondary cell converter 140 makes the secondary cell 130 store the regenerative electric power. The secondary cell converter 140 may have a configuration different from that of the fuel cell converter 120.

The inverter 150 converts the electric power supplied in the form of direct current from the fuel cell 110 and the secondary cell 130 through the DC lead wire W2 into three-phase AC electric power. The inverter 150 is electrically connected with the drive motor 200 through the AC lead wire W5 to supply the three-phase AC electric power to the drive motor 200. The inverter 150 also converts the regenerative electric power generated in the drive motor 200 into DC electric power, and outputs the converted electric power to the DC lead wire W2.

The drive motor 200 is an electric motor that converts the three-phase AC electric power supplied from the inverter 150 into rotational power.

The ECU 160 is a control unit that receives signals output from various sensors included in the fuel cell system 100 and controls operation of each unit of the fuel cell system 100. The ECU 160 controls operation of the fuel cell converter 120. The ECU 160 receives a signal representative of a measurement value VL from the voltage sensor 115.

The ECU 160 controls voltage by setting as a duty ratio timing of turning on and off the switching elements SW corresponding to the reactors L that constitute the fuel cell converter 120. The ECU 160 calculates a feedforward term for performing feedforward control with a continuous mode involving continuous application of electric current to the reactors L being distinguished from a discontinuous mode involving intermittent application of electric current to the reactors L.

Figure 3:
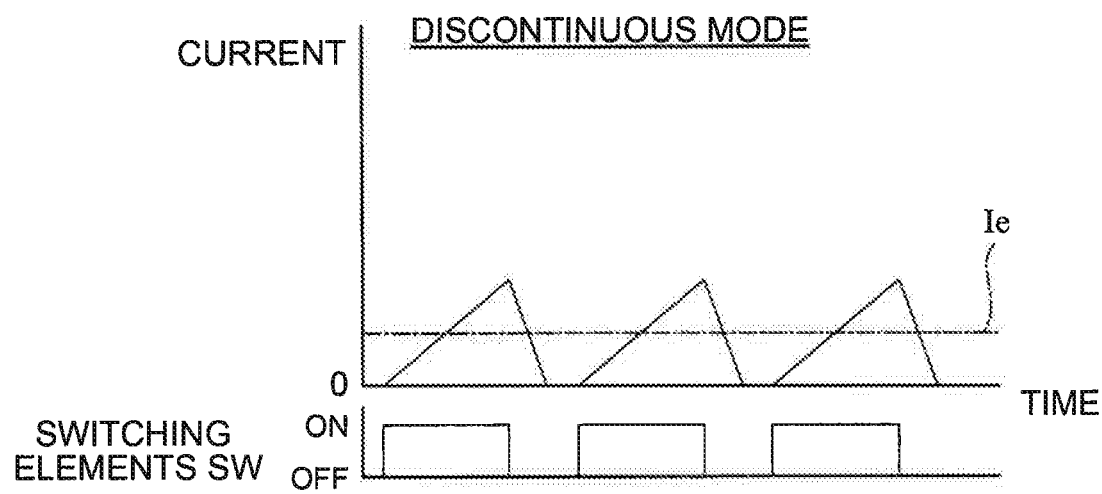
FIG. 3 is an explanatory view illustrating the state of electric current applied to reactors in a discontinuous mode.
Figure 4:
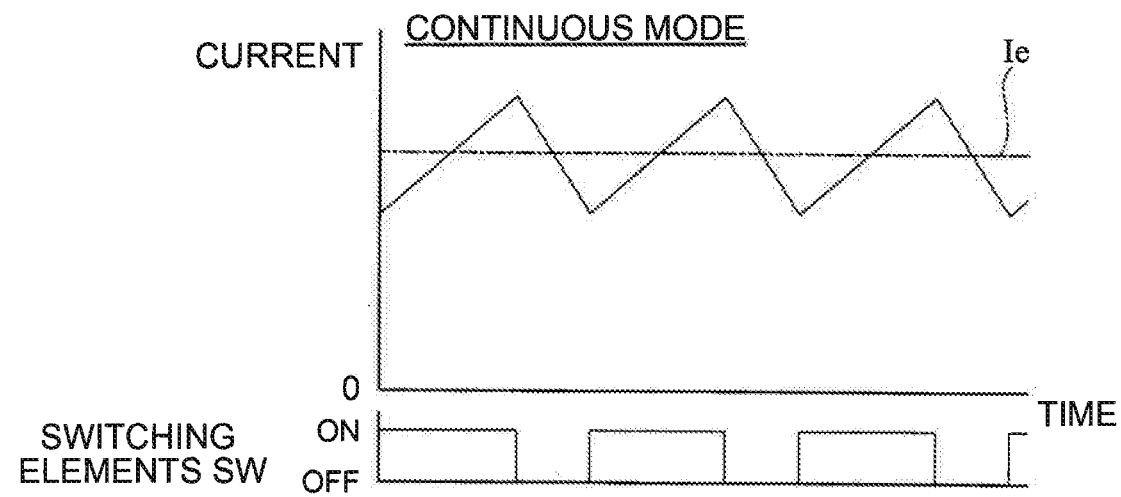
FIG. 4 is an explanatory view illustrating the state of electric current applied to the reactors in a continuous mode.

FIG. 3 is an explanatory view illustrating the state of electric current applied to the reactors L (FIG. 2) in the discontinuous mode. FIG. 4 is an explanatory view illustrating the state of electric current applied to the reactors L in the continuous mode. In FIGS. 3 and 4, Ie illustrated with a dashed line represents an effective current. In FIG. 3, the discontinuous mode is a mode where the electric current applied to the reactors becomes zero if the time when the switching elements SW (FIG. 2) are closed and set to ON is relatively short. In FIG. 4, the continuous mode is a mode where the electric current applied to the reactors L does not always become zero at once when the switching elements SW in the state of being opened and turned ON are turned OFF. In the continuous mode, the switching element SW1 is closed and turned ON before the electric current becomes zero. The effective current Ie in the continuous mode becomes larger than that in the discontinuous mode.

In the discontinuous mode, the feedforward term is calculated by Expression III below:

$$D\_FF = \sqrt{2 \cdot L \cdot f \cdot \frac{VH - VL}{VH \cdot VL} \cdot IL_{tgt}} \quad \text{(III)}$$

L: inductance of the reactor
f: switching frequency
ILtgt: a target value of effective electric current
VL (V): a measurement value of the output voltage of the fuel cell by the voltage sensor
VH (V): a measurement value of the output voltage of the fuel cell converter In the continuous mode, the feedforward term is calculated by Expression I below:

$$D\_FF = 1 - \frac{VL_{tgt}}{VH} \quad \text{(I)}$$

VH (V): a measurement value of the output voltage of the converter
VLtgt (V): an estimated value of the output voltage of the fuel cell In the continuous mode, the ECU 160 performs the following processing, when the ECU 160 causes the fuel cell converter 120 to boost the output voltage of the fuel cell 110 and when a feedforward term D_FF exceeds an upper limit D_FF_ul calculated by Expression II below. That is, the ECU 160 defines the sum of the upper limit D_FF_ul and the feedback term as a duty ratio D1, and causes the fuel cell converter 120 to boost the output voltage of the fuel cell 110 with the duty ratio D1.

$$D\_FF\_ul = 1 - \frac{VL}{VHul} \quad \text{(II)}$$

VL (V): a measurement value of the output voltage of the fuel cell by the voltage sensor
VHul (V): a preset upper limit in the output voltage of the converter The ECU 160 also performs the following processing, when the ECU 160 causes the fuel cell converter 120 to boost the output voltage of the fuel cell 110 and when the feedforward term D_FF is equal to or below the upper limit D_FF_ul. That is, the ECU 160 defines the sum of the feedforward term D_FF and the feedback term as a duty ratio D2, and causes the fuel cell converter 120 to boost the output voltage of the fuel cell 110 with the duty ratio D2.

In the feedforward term D_FF, the measurement value VH is a measurement value of the output voltage of the fuel cell converter 120. The estimated value VLtgt is an estimated value of the output voltage of the fuel cell 110.

In the upper limit D_FF_ul, the measurement value VL is a measurement value of the output voltage of the fuel cell 110 by the voltage sensor 115. The upper limit VHul is an upper limit preset for the output voltage of the fuel cell converter 120. In another embodiment, the upper limit VHul may be a value variable in accordance with the driving status of the fuel cell system 100.

The measurement value VH is a voltage requested for operation of the drive motor 200. The estimated value VLtgt is set in advance. The upper limit VHul is a value preset in the range of a maximum value of the measurement value VH allowable in the viewpoint of protecting the drive motor 200 or below and a maximum value that the measurement value VH can take in a normal control state in the fuel cell system 100 or above.

In the present embodiment, the upper limit D_FF_ul is calculated using the measurement value VL subjected to one processing out of filter processing and rate processing. The filter processing is processing for removing noise contained in the measurement value VL. The rate processing is processing for controlling data change speed to be a certain speed or below. Since such processing is executed in the present embodiment, the upper limit D_FF_ul can be calculated using an accurate measurement value VL. Accordingly, a proper upper limit D_FF_ul can be used for comparison with the feedforward term D_FF.

The feedback term is a value set for execution of feedback control based on error of the measurement value VL of the output voltage of the fuel cell 110 measured by the voltage sensor 115 and the like.

The error of the measurement value VL of the output voltage of the fuel cell 110 measured by the voltage sensor 115 is error between an actual voltage value and a measurement value VL in the fuel cell 110. The error includes (1) error generated when the voltage of the fuel cell 110 measured by the voltage sensor 115 is converted into a digital signal, and (2) error between a measurement value VL and an actual voltage in the fuel cell 110 generated due to a time lag between the time when the voltage sensor 115 measures the voltage of the fuel cell 110 and the time when a signal representative of the measurement value VL is output to the ECU 160 and received.

In the present embodiment, the ECU 160 outputs a signal S1 to the fuel cell converter 120, when the feedforward term D_FF exceeds the upper limit D_FF_ul. Upon reception of the signal S1, the fuel cell converter 120 starts boosting of the output voltage of the fuel cell 110 with the duty ratio D1.

In the present embodiment, the ECU 160 outputs a signal S2 to the fuel cell converter 120, when the feedforward term D_FF is equal to or below the upper limit D_FF_ul. Upon reception of the signal S2, the fuel cell converter 120 starts boosting of the output voltage of the fuel cell 110 with the duty ratio D2.

Figure 5:
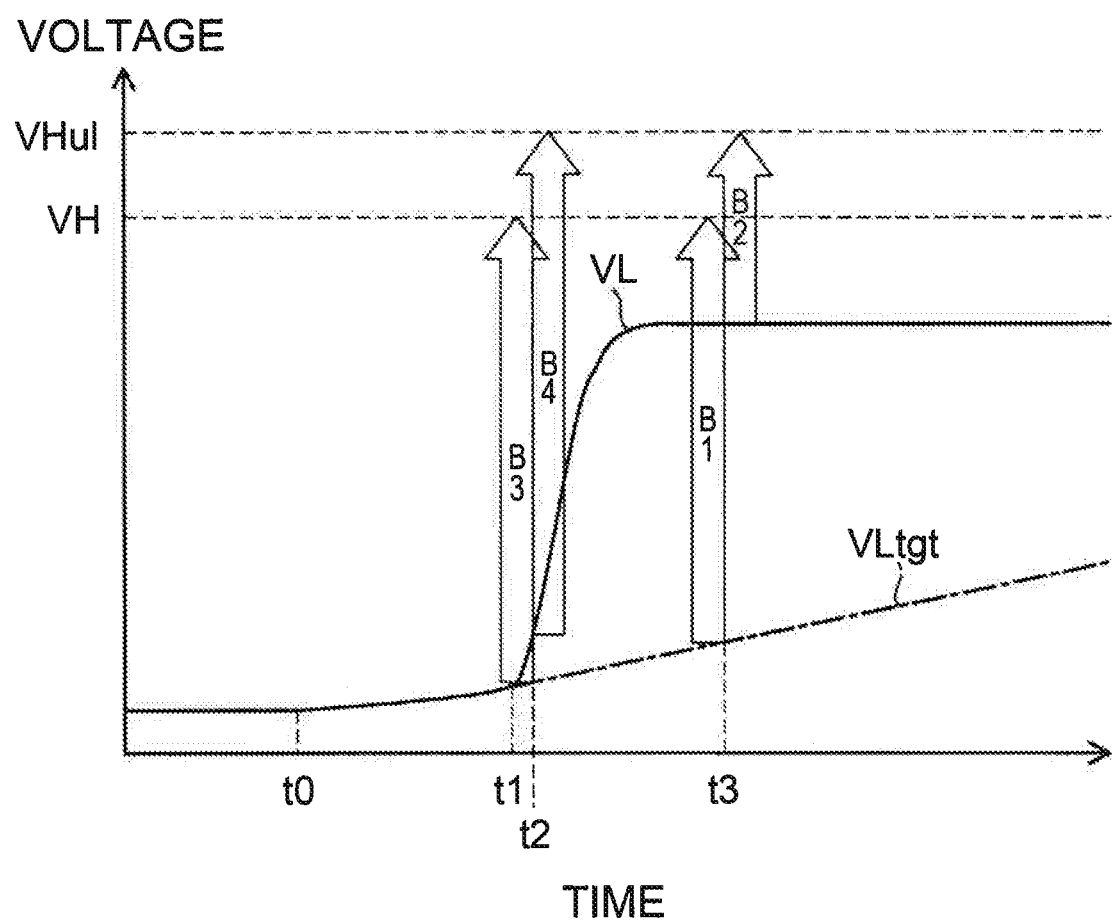
FIG. 5 is an explanatory view illustrating variations of a measurement value when a fuel cell starts power generation.

FIG. 5 is an explanatory view illustrating variations of the measurement value VL when the fuel cell 110 starts power generation in the present embodiment.

In the graph view of FIG. 5, a vertical axis represents voltage. A solid line VL in the graph view represents a measurement value VL of the output voltage of the fuel cell 110 measured by the voltage sensor 115.

A dashed dotted line VLtgt in the graph view represents an estimated value VLtgt of the output voltage of the fuel cell 110. The estimated value VLtgt before timing t1 of FIG. 5 overlaps with the measurement value VL.

At timing t0 of FIG. 5, power generation of the fuel cell 110 is started. Between timing t0 and timing t1 of FIG. 5, the measurement value VL of the output voltage of the fuel cell 110 measured by the voltage sensor 115 gradually goes up due to power generation of the fuel cell 110.

After timing t1 of FIG. 5, the measurement value VL of the voltage of the fuel cell 110 measured by the voltage sensor 115 largely goes up compared with the period between timing t0 and timing t1.

Meanwhile, after timing t1, the estimated value VLtgt rises with a small rise width compared with the measurement value VL. This is because a rate of rise of the estimated value VLtgt is set low enough to prevent sudden change of the duty ratio in the fuel cell converter 120 in order to stabilize the voltage output by the fuel cell converter 120.

For example, an arrow B1 represents a boosting width of the voltage in the case of boosting the estimated value VLtgt of the output voltage of the fuel cell 110 up to the measurement value VH of the output voltage at timing t3 of FIG. 5. In this case, since the measurement value VL is larger than the estimated value VLtgt, there is a high possibility that an actual output voltage (true value) of the fuel cell 110 is also larger than the estimated value VLtgt. Accordingly, when the actual voltage input into the fuel cell converter 120 is larger than the estimated value VLtgt, the actual output voltage of the fuel cell 110 is boosted by the boosting width expressed by the arrow B1. Therefore, there is a high possibility that the boosted voltage causes rise of the measurement value VH of the output voltage. Depending on circumstances, the measurement value VH may exceed the upper limit VHul.

In such circumstances, the fuel cell system 100 in the first embodiment sets the upper limit D_FF_ul as an upper limit of the feedforward term in the duty ratio used for boosting of the fuel cell converter 120. An arrow B2 represents the boosting width of the voltage in the case of boosting the measurement value VL to the upper limit VHul at timing t3 of FIG. 5. The boosting width of the arrow B2 is smaller than the boosting width of the arrow B1. The duty ratio for implementing the boosting represented by arrow B is expressed by Expression I (feedforward term D_FF). The duty ratio for implementing the boosting represented by the arrow B2 is expressed by Expression II (upper limit D_FF_ul). That is, at timing t3 of FIG. 5, the feedforward term D_FF exceeds the upper limit D_FF_ul. It means that the fuel cell system 100 causes the fuel cell converter 120 to boost the output voltage of the fuel cell 110 with the duty ratio D1.

For example, an arrow B3 represents a boosting width of the voltage in the case of boosting the estimated value VLtgt of the output voltage of the fuel cell 110 up to the measurement value VH of the output voltage at timing t2 of FIG. 5. An arrow B4 represents the boosting width of the voltage in the case of boosting the measurement value VL up to the upper limit VHul at timing t2 of FIG. 5. The boosting width of the arrow B4 is larger than the boosting width of the arrow B3. That is, at timing t2 of FIG. 5, the feedforward term D_FF is equal to or below the upper limit D_FF_ul. It means that the fuel cell system 100 causes the fuel cell converter 120 to boost the output voltage of the fuel cell 110 with the duty ratio D2.

In a related art of a fuel cell system, the rate of rise of the estimated value is set low enough to prevent sudden change of the duty ratio in the fuel cell converter in order to stabilize the voltage output from the fuel cell converter as indicated by the dashed dotted line VLtgt in the graph view of FIG. 5. In the related art of the fuel cell system, when a large divergence is present between an estimated value and an actual output voltage of the fuel cell, the fuel cell converter may excessively boost the output voltage of the fuel cell, and output the excessively boosted voltage.

In order to reduce such divergence, the estimated value of the voltage output from the fuel cell may be changed. However, it is technically difficult to estimate the output voltage of the fuel cell after power generation of the fuel cell is started. Under such circumstances, the rate of rise of the estimated value of the output voltage of the fuel cell is set low.

In the fuel cell system 100 in the first embodiment, the fuel cell converter 120 is controlled based on a size relation between the feedforward term D_FF and the upper limit D_FF_ul at the time of boosting the voltage output from the fuel cell 110. Accordingly, it is possible to prevent the fuel cell converter 120 from executing excessive boosting and output of the actual output voltage of the fuel cell 110. In other words, even in the case where the estimated value VLtgt of the output voltage of the fuel cell 110 is small as compared with the actual output voltage of the fuel cell 110, abnormal rise in the output voltage of the fuel cell converter 120 can be suppressed.

Figure 6:
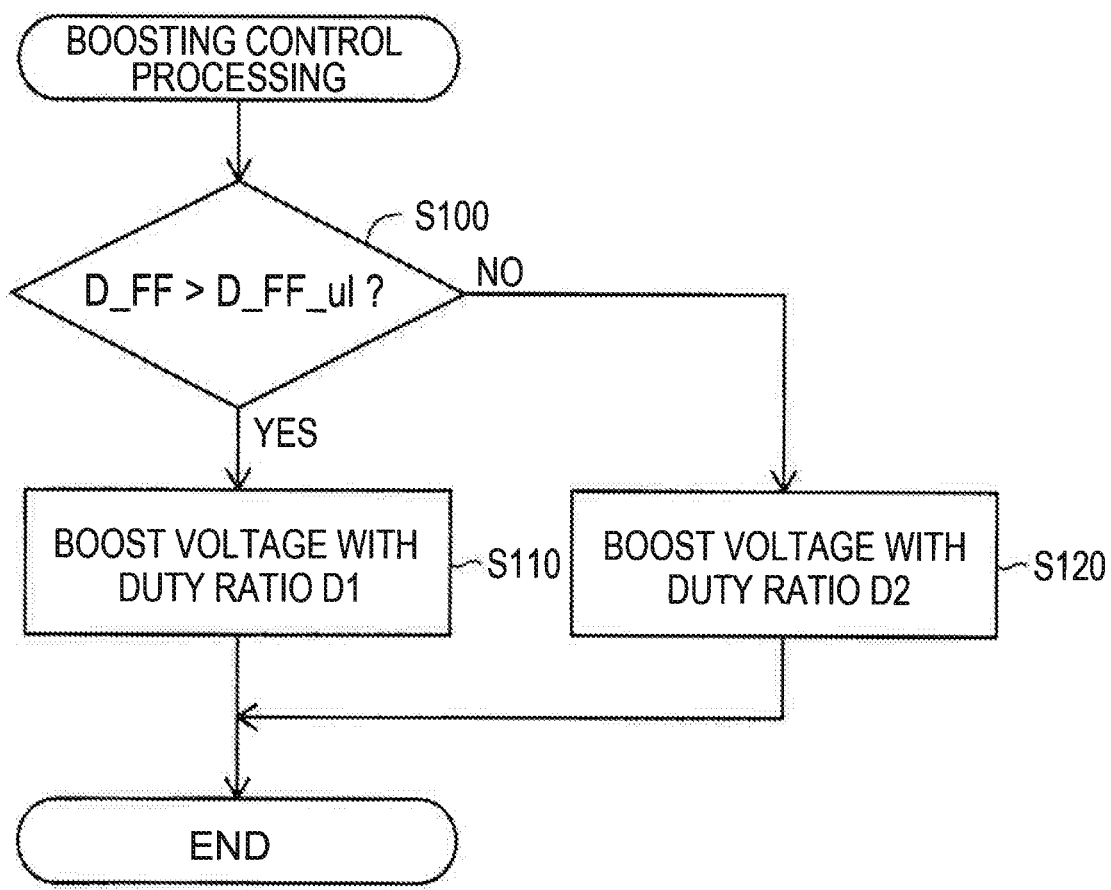
FIG. 6 is a flow illustrating boosting control processing executed by the fuel cell system.

FIG. 6 is a flow illustrating boosting control processing executed by the fuel cell system 100. The boosting control processing is periodically executed, when power generation of the fuel cell 110 is started and the continuous mode is asserted.

When the boosting control processing is started, it is determined in step S100 whether or not the feedforward term D_FF exceeds the upper limit D_FF_ul (step S100). When it is determined that the feedforward term D_FF exceeds the upper limit D_FF_ul (step S100: YES), the fuel cell system 100 causes the fuel cell converter 120 to boost the output voltage of the fuel cell 110 with the duty ratio D1 (step S110). Then, the boosting control processing of FIG. 6 is ended.

When it is determined that the feedforward term D_FF is equal to or below the upper limit D_FF_ul (step S100: NO), the fuel cell system 100 causes the fuel cell converter 120 to boost the output voltage of the fuel cell 110 with the duty ratio D2 (step S120). Then, the boosting control processing of FIG. 6 is ended.

According to the embodiments described in the foregoing, when the upper limit D_FF_ul is defined as an upper limit of a feedforward term, and the feedforward term D_FF exceeds the upper limit D_FF_ul, the ECU 160 causes the fuel cell converter 120 to boost the output voltage of the fuel cell 110 by using the duty ratio D1. This makes it possible to prevent the fuel cell converter 120 from executing excessive boosting and output of the actual output voltage of the fuel cell 110.

B. Modification

In the present embodiment, the control unit of the fuel cell system 100 is only the ECU 160, though the present disclosure is not limited thereto. For example, the control unit may be constituted of two or more control units that share the functions of the ECU 160.

Without being limited to the embodiments, examples, or modification, the present disclosure can be implemented in various configurations without departing from the meaning thereof. For example, technical features in the embodiments, examples, and modification corresponding to the technical features in each aspect disclosed in SUMMARY can properly be replaced or combined in order to solve some or all of the aforementioned problems, or in order to accomplish some or all of the aforementioned effects. The technical features may properly be deleted unless they are specified as essential elements in this specification.

What is claimed is:

1. A fuel cell system, comprising:
a fuel cell configured to generate electric power using reactant gas;
a voltage sensor configured to measure output voltage of the fuel cell;
a converter configured to boost the output voltage; and
a control unit programmed to control the converter using a duty ratio including a feedforward term and a feedback term, the feedforward term being set to perform feedforward control, the feedback term being set to perform feedback control, wherein
when the feedforward term calculated by Expression I below:

$$D\_FF = 1 - \frac{VLtgt}{VH} \quad (I)$$

VH (V): a measurement value of the output voltage of the converter
VLtgt (V): an estimated value of the output voltage of the fuel cell D_FF: feedforward term
exceeds an upper limit calculated by Expression II below:

$$D\_FF\_ul = 1 - \frac{VL}{VHul} \quad (II)$$

VL (V): a measurement value of the output voltage of the fuel cell by the voltage sensor
VHul (V): a preset upper limit in the output voltage of the converter
D_FF_ul: upper limit,
the control unit is programmed to cause the converter to boost the output voltage with a duty ratio including the upper limit and the feedback term,
when the feedforward term calculated by Expression I is equal to or below the upper limit, the control unit is programmed to cause the converter to boost the output voltage with a duty ratio including the feedforward term calculated by Expression I and the feedback term,
the control unit is programmed to calculate the upper limit using the measurement value of the output voltage of the fuel cell by the voltage sensor subjected to one processing out of filter processing and rate processing,
in a discontinuous mode involving intermittent application of electric current to a reactor of the converter, the control unit is programmed to calculate the feedforward term by Expression III below:

$$D\_FF = \sqrt{2 \cdot L \cdot f \cdot \frac{VH - VL}{VH \cdot VL} \cdot ILtgt} \quad (III)$$

L: inductance of the reactor
f: switching frequency
ILtgt: a target value of effective electric current
VL (V): a measurement value of the output voltage of the fuel cell by the voltage sensor
VH (V): a measurement value of the output voltage of the fuel cell converter
D_FF: the feedforward term
and
in a continuous mode involving continuous application of electric current to the reactor, the control unit is programmed to calculate the feedforward term by Expression I.

2. A fuel cell system, comprising:
a fuel cell configured to generate electric power using reactant gas;
a voltage sensor configured to measure output voltage of the fuel cell;
a converter configured to boost the output voltage; and
a control unit programmed to control the converter using a duty ratio including a feedforward term and a feedback term, the feedforward term being set to perform feedforward control, the feedback term being set to perform feedback control, wherein
when the feedforward term calculated by Expression I below:

$$D\_FF = 1 - \frac{VLtgt}{VH} \quad (I)$$

VH (V): a measurement value of the output voltage of the converter
VLtgt (V): an estimated value of the output voltage of the fuel cell
D_FF: feedforward term
exceeds an upper limit calculated by Expression II below:

$$D\_FF\_ul = 1 - \frac{VL}{VHul} \quad \text{(II)}$$

VL (V): a measurement value of the output voltage of the fuel cell by the voltage sensor
VHul (V): a preset upper limit in the output voltage of the converter
D_FF_ul: upper limit,
the control unit is programmed to cause the converter to boost the output voltage with a duty ratio including the upper limit and the feedback term,
when the feedforward term calculated by Expression I is equal to or below the upper limit, the control unit is programmed to cause the converter to boost the output voltage with a duty ratio including the feedforward term calculated by Expression I and the feedback term,
in a discontinuous mode involving intermittent application of electric current to a reactor of the converter, the control unit is programmed to calculate the feedforward term by Expression III below:

$$D\_FF = \sqrt{2 \cdot L \cdot f \cdot \frac{VH - VL}{VH \cdot VL} \cdot ILtgt} \quad \text{(III)}$$

L: inductance of the reactor
f: switching frequency
ILtgt: a target value of effective electric current
VL (V): a measurement value of the output voltage of the fuel cell by the voltage sensor
VH (V): a measurement value of the output voltage of the fuel cell converter
D_FF: the feedforward term
and
in a continuous mode involving continuous application of electric current to the reactor, the control unit is programmed to calculate the feedforward term by Expression I.

* * * * *